United States Patent
Rohde et al.

(10) Patent No.: US 10,536,222 B2
(45) Date of Patent: Jan. 14, 2020

(54) PHASE DEMODULATION METHOD AND CIRCUIT

(71) Applicant: Elenion Technologies, LLC, New York, NY (US)

(72) Inventors: Bernd-Harald Horst Jurgen Rohde, Munich (DE); Richard C. Younce, Naperville, IL (US)

(73) Assignee: Elenion Technologies, LLC, New York, NY (US)

(*) Notice: Subject to any disclaimer, the term of this patent is extended or adjusted under 35 U.S.C. 154(b) by 0 days.

(21) Appl. No.: 16/201,440

(22) Filed: Nov. 27, 2018

(65) Prior Publication Data

US 2019/0165869 A1 May 30, 2019

Related U.S. Application Data

(63) Continuation of application No. 15/357,392, filed on Nov. 21, 2016, now Pat. No. 10,171,176.

(51) Int. Cl.
*H04B 10/64* (2013.01)
*H04B 10/61* (2013.01)

(52) U.S. Cl.
CPC .......... *H04B 10/64* (2013.01); *H04B 10/612* (2013.01); *H04B 10/614* (2013.01)

(58) Field of Classification Search
CPC .... H04B 10/616; H04B 10/612; H04B 10/64; H04B 10/614
See application file for complete search history.

(56) References Cited

U.S. PATENT DOCUMENTS

| | | | | |
|---|---|---|---|---|
| 3,439,283 A | * | 4/1969 | Danielson | H04L 27/14 327/49 |
| 5,023,946 A | * | 6/1991 | Yamazaki | H04B 10/61 398/204 |
| 5,818,297 A | * | 10/1998 | Levionnais | H04L 27/2276 329/304 |
| 9,634,873 B1 | * | 4/2017 | Lo | H03D 3/00 |
| 2006/0193401 A1 | * | 8/2006 | Lopez Villegas | H04L 27/2276 375/326 |
| 2007/0058753 A1 | * | 3/2007 | Saavedra | H03D 3/26 375/329 |
| 2010/0277234 A1 | * | 11/2010 | Luo | A61N 1/3727 329/307 |
| 2014/0023163 A1 | * | 1/2014 | Xu | H04L 27/2272 375/327 |

* cited by examiner

*Primary Examiner* — Freshteh N Aghdam
(74) *Attorney, Agent, or Firm* — Stratford Managers Corporation

(57) ABSTRACT

An electrical circuit and method for de-modulation and carrier recovery of PSK modulated carrier signals in analog domain are described. A portion of the received PSK-modulated carrier signal is passed through a signal multiplication circuit to obtain a frequency-multiplied carrier that is absent of the PSK modulation, which is then passed through a frequency dividing circuit to obtain a reference carrier at the received carrier frequency. The reference signal is then mixed with the received PSK-modulated carrier signal to obtain a de-modulated baseband signal. The method may be used in heterodyne receivers of optical BPSK and QPSK signals.

19 Claims, 14 Drawing Sheets

PHASE DEMODULATION METHOD AND CIRCUIT

CROSS-REFERENCE TO RELATED APPLICATIONS

This application is a continuation of U.S. patent application Ser. No. 15/357,392, filed Nov. 21, 2016, now allowed, which is hereby incorporated by reference herein in its entirety.

FIELD OF THE INVENTION

The invention generally relates to methods and systems for detecting signals modulated using phase shift keying (PSK), and more particularly relates to a method and circuit for demodulating PSK-modulated carrier wave signals.

BACKGROUND OF THE INVENTION

The use of phase modulated optical signals in optical communication systems offers considerable advantages over on-off keying of optical signals intensity in many cases. Examples of phase modulation formats that have attracted particular attention in optical applications include various phase-shift keying (PSK) modulation formats, such as binary PSK (BPSK) and quadrature PSK (QPSK). However, demodulating such signals is more complicated than detecting and demodulating intensity modulated signals. One known phase demodulation scheme includes the use of delay line interferometers, in which an input PSK modulated optical signal is coherently combined with a copy thereof that is delayed by one PSK symbol. One disadvantage of such schemes is that they are not bit rate flexible, i.e. the fixed delay line only decodes signals modulated at a certain bit rate. Furthermore, the delay lines may have to be rather long; for example, a 1 Gbit/s signal requires a delay line that is about 20 cm long, which is not practical in small form factor components.

Another known PSK decoding schemes uses optical homodyne detection, in which light from a local oscillator (LO) laser is mixed with the PSK modulated light of a transmitter laser. Both the LO laser and the transmitter laser can be made stable, and the LO laser can be optically locked to the transmitter laser. This solution is however not very cost efficient.

In a conventional scheme of optical coherent homodyne reception the detected signals from one or more photodiodes are digitized, and the phase detection is done in a digital signal processor (DSP). However, sufficiently fast digitizers and DSPs may be expensive and power hungry. In some schemes with optical LO phase locking, the control signal of a phase tracking circuit itself can be used as a demodulated signal. This however works only for limited data rates.

In the case of coherent heterodyne reception, e.g., when wavelengths of the LO and transmitter lasers differ, the tracking of the phase can be done in the electric domain instead of the optical domain. Known techniques however typically require a fast tunable voltage controlled oscillator (VCO), which may be expensive; furthermore, designing a sufficiently robust control loop using a VCO is a non-trivial task.

Accordingly, it may be understood that there may be significant problems and shortcomings associated with current solutions and technologies for demodulating PSK modulated electrical and optical signals, including those used in high-speed optical communication systems.

SUMMARY OF THE INVENTION

Accordingly, an aspect of the present disclosure relates to a method and apparatus for demodulating an optical PSK signal wherein the optical PSK signal is first converted into an electrical carrier that is PSK-modulated, and then the PSK-modulated electrical carrier is de-modulated using an analog electrical circuit. Another aspect of the present disclosure relates to a method and circuit for demodulating analog electrical signals comprising a PSK-modulated carrier wave.

An aspect of the present disclosure relates to a method of demodulating a received carrier signal that is modulated using a phase shift keying (PSK) modulation format, the method comprising: a) splitting the received carrier signal into two analog PSK-modulated signals, each comprising a PSK-modulated carrier wave signal with a carrier wave frequency f that may vary in time; b) passing a first of the two analog PSK-modulated signals through a multiplying circuit to obtain a frequency-multiplied carrier signal; c) passing the frequency multiplied carrier signal through a first frequency dividing circuit to obtain a first reference carrier wave signal with the carrier wave frequency f; and, d) mixing the first reference carrier wave signal with the second of the two analog PSK-modulated signals using a first RF signal mixer to obtain a first de-modulated signal therefrom.

In accordance with an aspect of the present disclosure, step (b) of the method may include directing a first of the two analog PSK-modulated signals into two input ports of an electrical signal mixer. In accordance with one aspect of the disclosure, step (c) of the method may include passing the frequency-multiplied carrier signal through an electrical switching circuit that is configured to switch a transmission state thereof in phase with every peak of an input signal. The electrical switching circuit may be an ON-OFF switching circuit, and may comprise an electrical frequency-dividing flip-flop circuit.

In accordance with an aspect of the present disclosure, the received carrier signal may comprise a binary PSK (BPSK) modulated signal, and step (b) may include passing the first of the two analog PSK-modulated signals through a signal squaring circuit to obtain a frequency-doubled signal.

In accordance with an aspect of the present disclosure, the received carrier signal may comprise a quadrature PSK (QPSK) modulated signal, and step (b) may include passing the first of the two analog PSK-modulated signals through two signal squaring circuits in series.

In accordance with an aspect of the present disclosure, the received carrier signal may comprise a $2^M$PSK modulated signal, where M is an integer greater than 0, and step (b) may include passing the first of the two analog PSK-modulated signals through M signal squaring circuits connected in series.

In accordance with an aspect of the present disclosure, the received carrier signal may comprise a $2^M$PSK modulated signal, where M is an integer greater than 0, and step (c) may include passing the frequency-multiplied carrier wave signal through M frequency-dividing electrical flip-flop circuits connected in series.

One aspect of the present disclosure provides an electrical circuit for demodulating a received carrier signal that is modulated using a PSK modulation format, the electrical circuit comprising: an input signal splitter configured to split the received carrier signal into two analog PSK-modulated signals, each comprising a PSK-modulated carrier wave with a carrier wave frequency f that may vary in time; a multiplying circuit disposed to receive a first of the two analog PSK-modulated signals and configured to convert it into a frequency-multiplied carrier signal; a frequency dividing circuit configured to convert the frequency multiplied carrier signal into a first reference carrier wave signal with the carrier wave frequency f; a first electrical signal mixer configured to mix the first reference carrier wave signal with the second of the two analog PSK-modulated signals to extract a de-modulated signal therefrom; and, an electrical transmission line connecting the input electrical signal splitter with the first RF signal mixer. The frequency-multiplying circuit may comprise one or more electrical signal mixers connected in series. The first frequency dividing circuit may comprise one or more electrical flip-flop circuits connected in series so as to down-covert the frequency-multiplied analog carrier signal to the carrier wave frequency f.

An aspect of the present disclosure provides an electrical circuit for demodulating a received carrier signal that is modulated using a $2^M$PSK modulation format where M is an integer greater than 0, the electrical circuit comprising: an input signal splitter configured to split the received carrier signal into two analog $2^M$PSK-modulated signals, each comprising a $2^M$PSK-modulated carrier wave with a carrier wave frequency f that may vary in time; a multiplying circuit disposed to receive a first of the two analog PSK-modulated signals and configured to convert it into a frequency-multiplied analog carrier signal with a frequency $2^M$f, the multiplying circuit comprising M signal squaring circuits connected in series; a frequency dividing circuit configured to convert the frequency multiplied analog carrier signal into a first analog reference carrier wave signal with the carrier wave frequency f, the frequency dividing circuit comprising M frequency-dividing flip-flop circuits; a first electrical signal mixer configured to mix the first analog reference carrier wave signal with the second of the two analog $2^M$PSK-modulated signals to extract a de-modulated signal therefrom; and, an electrical transmission line connecting the input electrical signal splitter with the first electrical signal mixer.

An aspect of the present disclosure provides a method of demodulating an optical PSK-modulated signal, the method comprising: a) using an optical heterodyne receiver to obtain a PSK-modulated electrical carrier signal having a carrier frequency f that may vary in time and that is greater than a PSK modulation rate $R_{mod}$ of the optical PSK-modulated signal; b) splitting the PSK-modulated electrical carrier signal into two analog PSK-modulated signals, each comprising a PSK-modulated carrier wave signal with the carrier wave frequency f; c) passing a first of the two analog PSK-modulated signals through a multiplying circuit to obtain a frequency-multiplied carrier signal; d) passing the frequency multiplied carrier signal through a first frequency dividing circuit to obtain a first reference carrier wave signal with the carrier wave frequency f; and, e) mixing the first reference carrier wave signal with the second of the two analog PSK-modulated signals using a first RF signal mixer to obtain a first de-modulated signal therefrom.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
PSK Phase Shift Keying
BPSK Binary Phase Shift Keying
QPSK Quaternary Phase Shift Keying
QAM Quadrature Amplitude Modulation
RF Radio Frequency
CMOS Complementary Metal-Oxide-Semiconductor
GaAs Gallium Arsenide
InP Indium Phosphide
$LiNO_3$ Lithium Niobate
PIC Photonic Integrated Circuits
SOI Silicon on Insulator
SiGe Silicon Germanium Note that as used herein, the terms "first," "second" and so forth are not intended to imply sequential ordering, but rather are intended to distinguish one element from another, unless explicitly stated. Similarly, sequential ordering of method steps does not imply a sequential order of their execution, unless explicitly stated. The word 'using,' when used in a description of a method or process performed by a device, component, or circuit, is to be understood as referring to an action performed by device, component, or circuit itself or by an element thereof rather than by an external agent. The term 'analog' refers to signals that encode information in a continuously varying parameter or parameters, such as for example electrical field, voltage, or current, and to circuits configured to respond to the continuously varying parameter or parameters to process that information; the term 'analog' is used herein to distinguish from digital signals or circuits that encode or process information by switching between a finite set of values or states. The terms 'carrier' and 'carrier wave' are used herein interchangeably to refer to a periodic or quasi-periodic signal, such as a sinusoidal wave, that may be modulated in phase, frequency, or amplitude and that is characterized by a carrier wave frequency that is typically greater than the modulation rate. In the context of the present disclosure, "RF" may refer to frequencies ranging from a few kilohertz (kHz) to tens of gigahertz (GHz).

Figure 1:
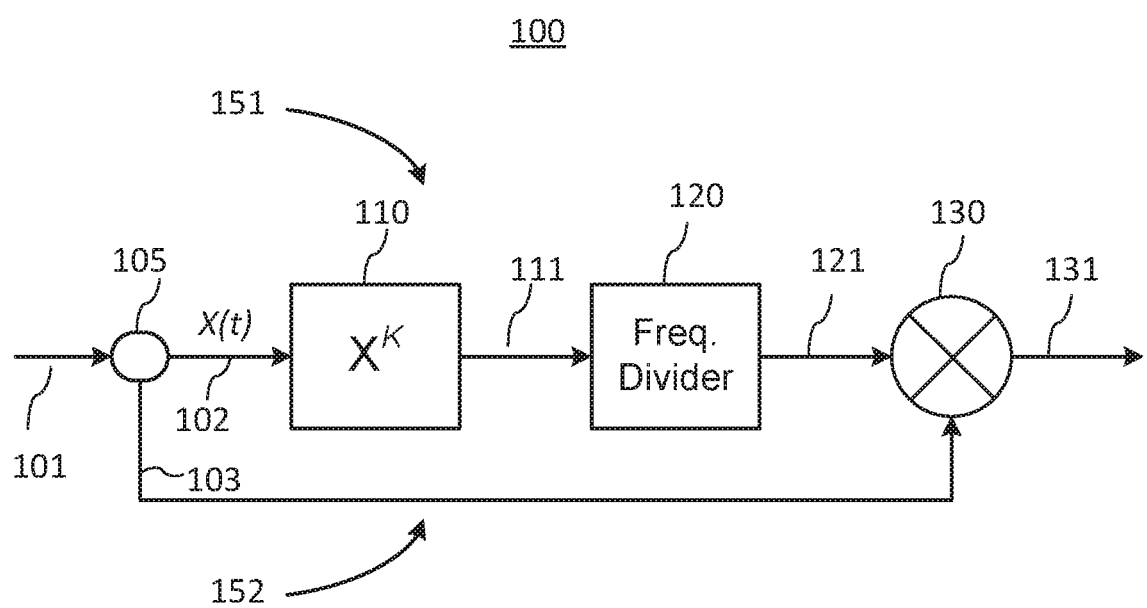
FIG. 1 is a schematic block diagram of an electrical circuit for demodulating a PSK-modulated carrier wave signal that incorporates a multiplying circuit and a frequency divider for generating a homodyne reference signal.

With reference to FIG. 1, there is schematically illustrated an example electrical circuit 100 for demodulating a received carrier signal 101 that is modulated using a phase shift keying (PSK) modulation format. The received carrier signal 101 may be an electrical RF signal and may also be referred to as the received PSK signal, and may be in the form of an electrical carrier wave X(t) having a carrier wave frequency f and a PSK modulated phase $\phi(t)$, $X(t)=A\cdot\exp[j2\pi ft+j\phi(t)]$, where $\phi(t)=\phi_{mod}(t)+\phi_0(t)$, with $\phi_{mod}(t)$ denoting the PSK modulation component and $\phi_0(t)$ denoting a background component of the carrier wave phase; $\phi_0(t)$ may slowly vary in time, at a rate that is typically smaller than the modulation rate $R_{mod}$ of the PSK modulation, due to, for example, noise or circuit non-idealities, effectively resulting in slight variations in the apparent carrier wave frequency of the received PSK signal 101.

Generally the PSK modulation may switch the PSK phase component $\phi_{mod}(t)$ between K possible phase values, K=2, 3, . . . , separated by $2\pi/K$ radian (rad); PSK modulation of this type may be referred to as K-PSK. In representative embodiments K=$2^M$, and the PSK modulation may switch the phase $\phi_{mod}(t)$ between $2^M$ possible phase values, M=1, 2, . . . , separated by $2\pi/2^M$ radian (rad); PSK modulation of this type may be referred to as $2^M$PSK, with M=1 known as binary PSK (BPSK), and M=2 known as quaternary PSK or quadrature PSK (QPSK). Example embodiments described hereinbelow relate to demodulating of BPSK and QPSK modulated carrier wave signals. It will be appreciated however that principles described hereinbelow may be extended to higher-order PSK signals as well, including $2^M$PSK with M>2, and generally to K-PSK with K≥2.

The carrier wave frequency f and/or the background phase $\phi_0$ of the input PSK signal 101 may vary in time, for example due to noise in transmission or in preceding signal-processing circuits. The PSK demodulating circuit 100 is configured to generate, using mostly analog electrical circuitry, a first reference carrier wave signal 121 that accounts for these variations and may be used as a homodyne reference in the demodulation process. The PSK demodulating circuit 100 may include an input signal splitter 105 that is configured to split the input analog PSK signal 101 into two analog PSK signals 102 and 103 and to direct one of them along a carrier recovery path 151 and another—along a signal path 152, to be re-combined at a first output electrical signal mixer 130. Each of the analog PSK signals 102 and 103 is in the form of a PSK-modulated carrier wave with the carrier wave frequency f and phase $\phi$ that vary in time in substantially the same way in each of the two signals 102 and 103.

The signal path 152 may be in the form of an electrical transmission line 103 that connects one of the output ports of the input signal splitter 105 to one of the input ports of the first output signal mixer 130. In some embodiments, it may include other circuit elements, devices or sub-circuits such as, for example, a signal amplifier. In one embodiment the carrier recovery path 151 has an electrical length that matches the electrical length of the signal path 152 so that substantially no or little phase difference is generated for signals propagating along these two paths from the input splitter 105 to the first output mixer 130. In one embodiment one of these paths 152, 152 may include a $\pi/2$ phase shifter, or a tunable phase shifter that may be tuned to provide a desired electrical phase difference between the paths 151 and 152. The issue of electrical lengths of the paths 151 and 152 may be of a small concern at carrier frequency f that is on the order or smaller than about 10-20 GHz provided that the circuit 100 is sufficiently compact, so both of the paths 151 and 152 are short compared to the carrier wavelength v/f, where v is the effective signal propagation speed in the circuit.

The carrier recovery path 151 is configured to convert the first analog PSK-modulated carrier signal 102 into an analog reference carrier wave signal 121 that is substantially absent of the PSK modulation but retains variations in the carrier frequency f and/or background phase $\phi_0$ that is present in the received PSK signal 101. For that purpose, the first analog PSK-modulated signal 102 is first directed to pass through a multiplying circuit 110 that is configured to convert it into a frequency-doubled, or generally frequency-multiplied analog carrier signal 111 with a frequency that is multiple of f but that is substantially absent of the PSK modulation that was present in the received PSK modulated signal 101. The frequency-multiplied analog carrier signal 111 is then passed through a first frequency dividing circuit 120 that is configured to convert the frequency-multiplied analog carrier signal 111 into the reference carrier wave signal 121 with the carrier wave frequency f. In an embodiment wherein the received carrier is K-PSK modulated, the multiplying circuit 110, which may also be referred to herein as the signal multiplying circuit 110, may be configured to multiply the PSK modulated analog carrier wave signal 102 X(t) by itself K times, and to output the frequency-multiplied signal 111 that is proportional to $[X(t)]^K$ and has a multiplied carrier frequency Kf. The frequency dividing circuit 120 may be then a circuit that divides the frequency of its received signal 111 by K, thereby recovering the carrier frequency of the received carrier signal 101. The reference carrier wave signal 121, which may also be referred to herein as the first (analog) reference carrier wave signal 121, or simply as the first reference signal 121, is then mixed with the second PSK modulated signal 103 in the first output signal mixer 130, producing an output signal 131 that may be in the form of, or include, a de-modulated signal carrying the PSK modulation information in the baseband. The first output signal mixer 130 may be embodied using any suitable non-linear electrical circuit or device that outputs one or more products of two input signals, including a signal at a frequency that is equal to the difference between frequencies of the input signals. Such circuits are well-known in the art as frequency mixers and may be embodied using one or more diodes or transistors. Since the two signals 121 and 103 that are input to the first output signal mixer 130 are of the same carrier wave frequency f the de-modulated signal 131 is a baseband signal generally proportional to $\sin(\phi_m(t)+\phi_1)$, where $\phi_1$ is a constant or slowly varying phase offset. Here, "slowly" means at a rate that is smaller than the PSK modulation rate $R_{mod}$, and typically at a rate that is at least 10 times smaller than the carrier frequency f. The input signal splitter 105 may be in the form of a simple passive signal splitter, or may be a component or circuit that generates or produces the first and/or second PSK signals 102, 103 that substantially copy the time dependence of the carrier wave frequency f and phase $\phi(t)$ of the input PSK signal 101.

Figure 2A:
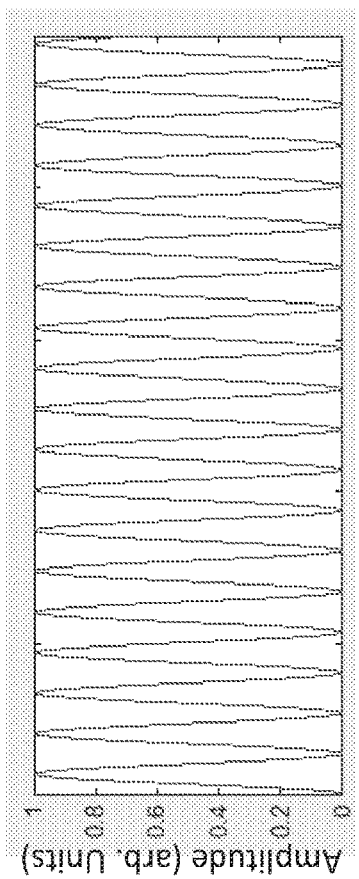
FIG. 2A is a plot illustrating an example BPSK-modulated carrier wave signal.
Figure 2B:
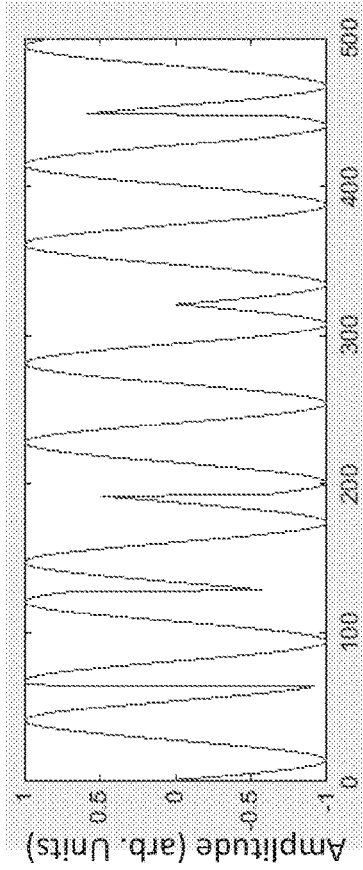
FIG. 2B is a plot illustrating the example BPSK-modulated carrier wave signal of FIG. 2A after the multiplying circuit in FIG. 1.
Figure 2C:
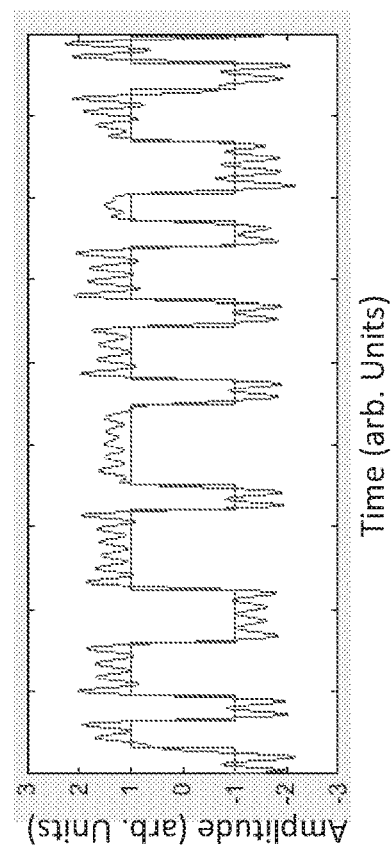
FIG. 2C is a plot illustrating the example BPSK-modulated carrier wave signal of FIG. 2A after the frequency divider in FIG. 1.
Figure 2D:
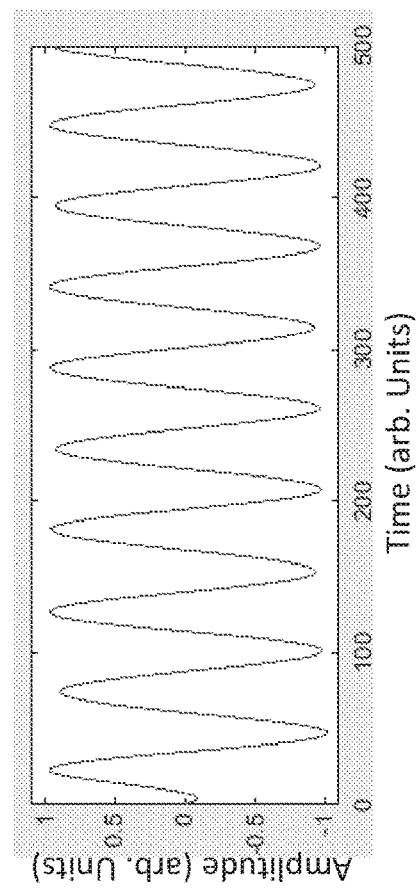
FIG. 2D is a plot illustrating an output demodulated BPSK signal after the output mixer in FIG. 1.

With reference to FIGS. 2A-2D, in one embodiment the received PSK-modulated signal 101 is in the form of a BPSK modulated carrier wave, which may be mathematically represented by a sine wave with the carrier wave frequency f and the phase $\phi(t)$ that undergoes a sequence of jumps by $\pi$ rad, as illustrated in FIG. 2A. The carrier wave frequency f may slightly vary with time due to noise or circuit non-idealities. The multiplying circuit 110 in this embodiment may be a squaring circuit that outputs substantially a square $X^2(t)$ of its input PSK-modulated signal X(t) 102. In this embodiment, the output frequency-multiplied signal 111, that may be denoted Y(t), is a frequency-doubled signal oscillating at a frequency 2f that is double the carrier wave frequency f of the input PSK modulated signal 101. The $\pi$ rad jumps in phase of the frequency-doubled signals 111 are substantially eliminated by the squaring operation in the signal squaring circuit 110, as illustrated in FIG. 2B. Advantageously, the frequency-doubled signal 111 retains the slower, non-modulation-related variations in frequency f and/or phase $\phi$ that may be present in the input PSK modulated signal 101. The frequency dividing circuit 120 then performs a frequency-division-by-2 operation on the frequency-doubled signal 111 and outputs the reference carrier signal 121 at the carrier wave frequency f which is illustrated in FIG. 2C and which also retains the non-BPSK variations in frequency f and/or phase $\phi$ of the input PSK modulated signal 101. The first output signal mixer 130, which is configured to mix the reference carrier wave signal 121 with the second BPSK-modulated carrier wave signal 103, outputs the de-modulated signal 131 which in this embodiment is a binary signal as schematically illustrated in FIG. 2D.

Figure 3:
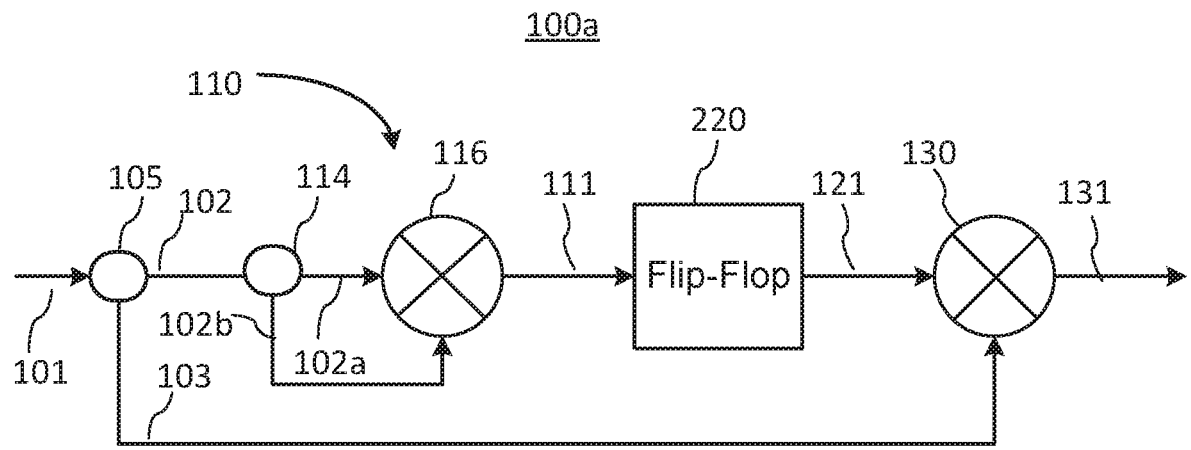
FIG. 3 is a schematic block diagram illustrating an embodiment of the circuit of FIG. 1 for demodulating BPSK signals, with an electrical signal mixer in the multiplying circuit.

Turning now to FIG. 3, in one embodiment 100a the signal multiplying circuit 110 is a signal-squaring circuit that may be in the form, or include, an electrical signal mixer 116 that has two input ports and one output port and that is configured to mix the first analog PSK-modulated carrier signal 102 with a copy or a portion of itself 102a, thus producing at its output port a signal Y(t) proportional to the product X(t)·X(t) of the input PSK-modulated carrier signal X(t) 101 or 102. The electrical signal mixer 116 may also be referred to herein as the input (electrical) signal mixer 116. The signal squaring circuit 110 may also include at its input a second signal splitter 114 that splits the first PSK signal 102 into two portions or copies 102a and 102b, which are then directed to the input ports of the second signal splitter 114.

Figure 4A:
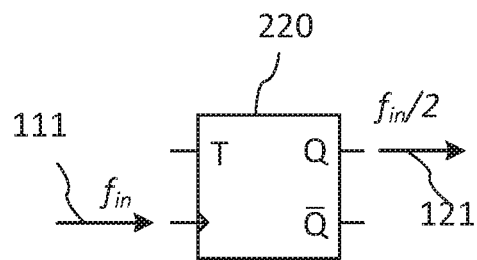
FIG. 4A is a schematic diagram illustrating an electrical T flip-flop suitable for use as a frequency divider by two in the circuits of FIGS. 1 and 3.
Figure 4B:
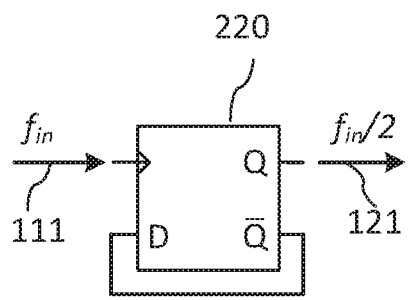
FIG. 4B is a schematic diagram illustrating an electrical D flip-flop suitable for use as a frequency divider by two in the circuits of FIGS. 1 and 3.

The frequency dividing circuit 120 may be implemented as, for example, a switching circuit 220 that is configured to block every other peak or oscillation of its input signal, or to switch a transmission state or an output state thereof in phase with every peak or oscillation of its input signal, such as for example a binary counter that generates one output pulse for every two input pulses or oscillations. In one embodiment, the signal switching circuit 220 may be for example in the form of a frequency dividing electrical flip-flop circuit, which is well-known in the art. FIGS. 4A and 4B illustrate the frequency-dividing switching circuit 220 embodied as a T (toggle) flip-flop and a D (delay) flip-flop, respectively, each of which may be used as the frequency-dividing circuit 120. A suitable flip-flop circuit may be implemented for example using pairs of bipolar junction or field effect transistors as also well known in the art. For example when the 'T' input in the T flip-flop is held 'high,' the T flip-flop divides the 'clock' frequency by two. By way of example, the carrier wave frequency f may be an RF frequency, for example 12 GHz. Then the flip-flop circuit 220 that receives at its clock input the frequency-doubled signal 111 at 24 GHz, will output a signal at the carrier wave frequency of 12 GHz.

An electrical flip-flop circuit such as illustrated in FIGS. 4A and 4B may be configured to be triggered by a rising or falling 'edge' of an input pulse signal, which in the embodiment 100a of FIG. 3 is exemplified by the frequency-doubled signal 111. However, a sine wave doesn't have well-defined 'edges,' which may potentially lead to a jitter at the output of the flip-flop 220. Therefore in some embodiments it may be desirable to add an edge-sharpening filter prior to the frequency dividing flip-flop.

Figure 5:
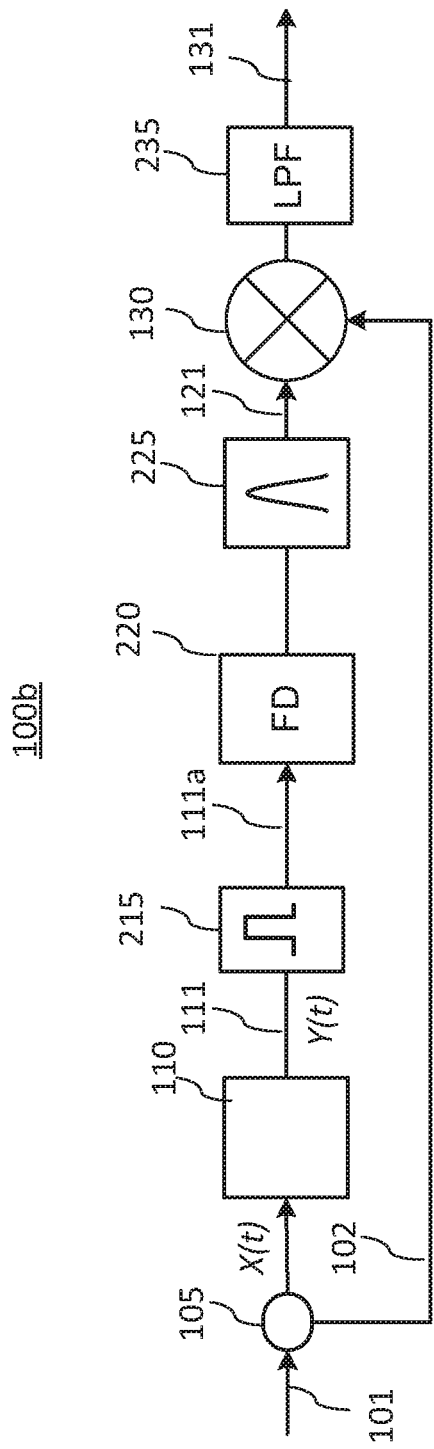
FIG. 5 is a schematic block diagram illustrating an embodiment of the circuit of FIG. 1 incorporating an edge-sharpening filter.

With reference to FIG. 5, there is illustrated an embodiment 100b of the PSK demodulating circuit 100 which incorporates an edge-sharpening filter 215 between the signal squaring circuit 110 and the frequency dividing flip-flop 220. The edge-sharpening filter 215 may be configured to implement, substantially, an approximation to the signum function sign(Y(t)). For example it may be configured to output a 'high' value when the input frequency-doubled or, generally, frequency-multiplied signal 111 Y(t) is positive, and a low' value, for example zero, when the input frequency-doubled or, generally, frequency-multiplied signal 111 Y(t) is negative, or vice versa. Such a filter may be implemented, for example, using a high-gain limiting amplifier that is configured to limit its output to a constant 'high' or 'low' value whenever the input signal 111 Y(t) rises in value above a small fraction of its amplitude; other embodiments may be possible as will be apparent to those skilled in the art.

Figure 6A:
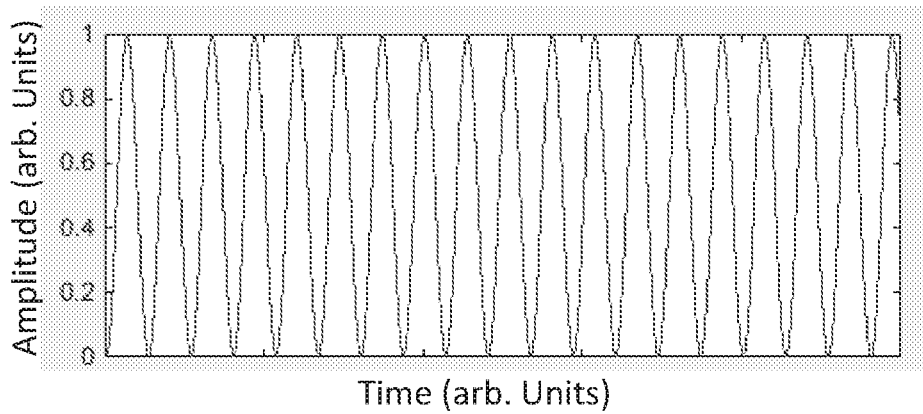
FIG. 6A is a plot illustrating an electrical signal at the output of the signal squaring circuit in FIG. 5.
Figure 6B:
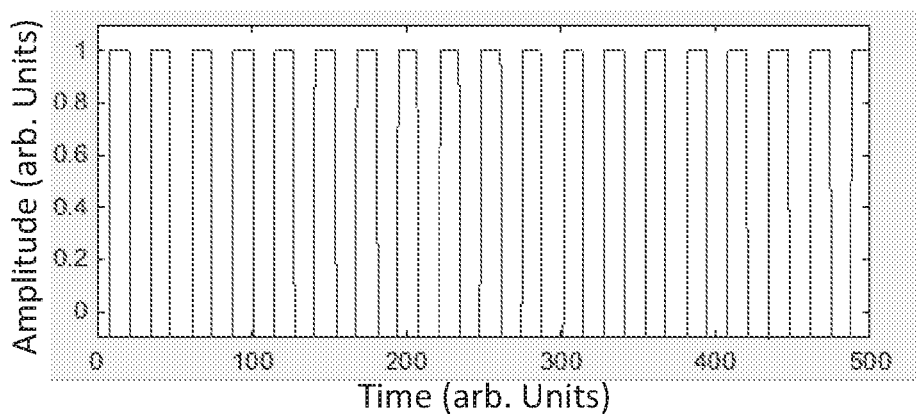
FIG. 6B is a plot illustrating an electrical signal at the output of the edge-sharpening filter in the circuit of FIG. 5.
Figure 6C:
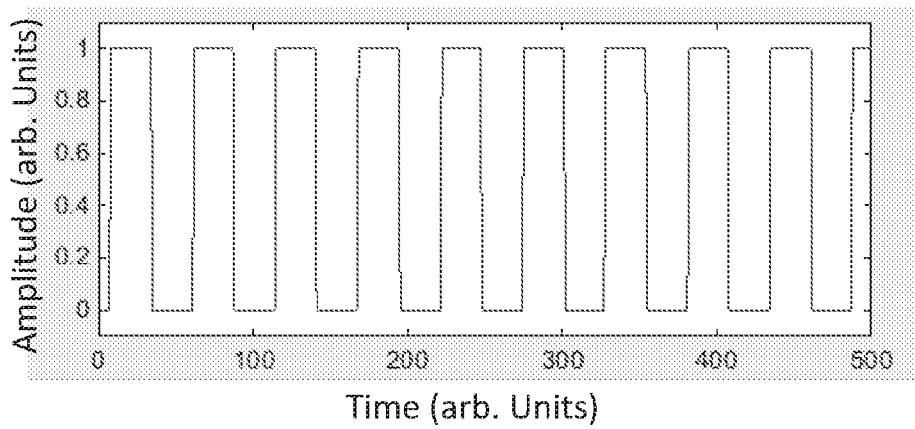
FIG. 6C is a plot illustrating an electrical signal at the output of the frequency dividing electrical flip-flop in the circuit of FIG. 5.

Referring also to FIGS. 6A-6C while continuing to refer to FIG. 5, the edge-sharpening filter 215 converts the frequency-doubled, or generally frequency-multiplied, signal 111, which is schematically illustrated in FIG. 6A, into a frequency-doubled square-wave signal 111a that is schematically illustrated in FIG. 6B. The frequency dividing flip-flop 220 then down-converts the frequency-doubled square-wave signal 111a into a square-wave signal at the carrier frequency f that is half of the doubled frequency 2f of its input signal 111a, as schematically illustrated in FIG. 6C. An optional passband or low-pass filter 225 may be added after the frequency-dividing circuit 220 so as to filter out all higher-order harmonics nf, n=2, of the input carrier frequency f while allowing the carrier frequency f to propagate, resulting in a generally sinusoidal reference carrier wave signal 121 at frequency f as illustrated in FIG. 2C. In one embodiment, an output low-pass filter (LPF) 235 may further be added after the first output signal mixer 130 so as to eliminate frequency-doubled components that may appear at the output of the mixer 130. LPF 235 may have a cutoff frequency of the order of the BPSK modulation rate $R_{mod}$ or slightly lower.

We found that the PSK demodulation technique described hereinabove with reference to FIGS. 1-6 may also be applied when the received PSK signal 101 includes a degree of amplitude modulation. An extraneous amplitude modulation may appear, for example, when the input PSK modulated carrier wave 101 was produced by an optical heterodyne receiver of an optical BPSK signal that was in turn produced using an optical phase modulator based on a semiconductor optical amplifier (SOA). Optical BPSK signals produced by Mach-Zehnder Modulators (MZM) driven with a $\pm V_\pi$ drive voltage may also have a significant amplitude modulation component, as the optical amplitude of MZM modulated light may undergo a zero crossing between subsequent changing symbols. We found, however, that undesirable effects of such amplitude modulation may be mitigated when using the method of the present disclosure, for example by adding a band-pass filter (BPF) after the signal squaring circuit.

Figure 7:
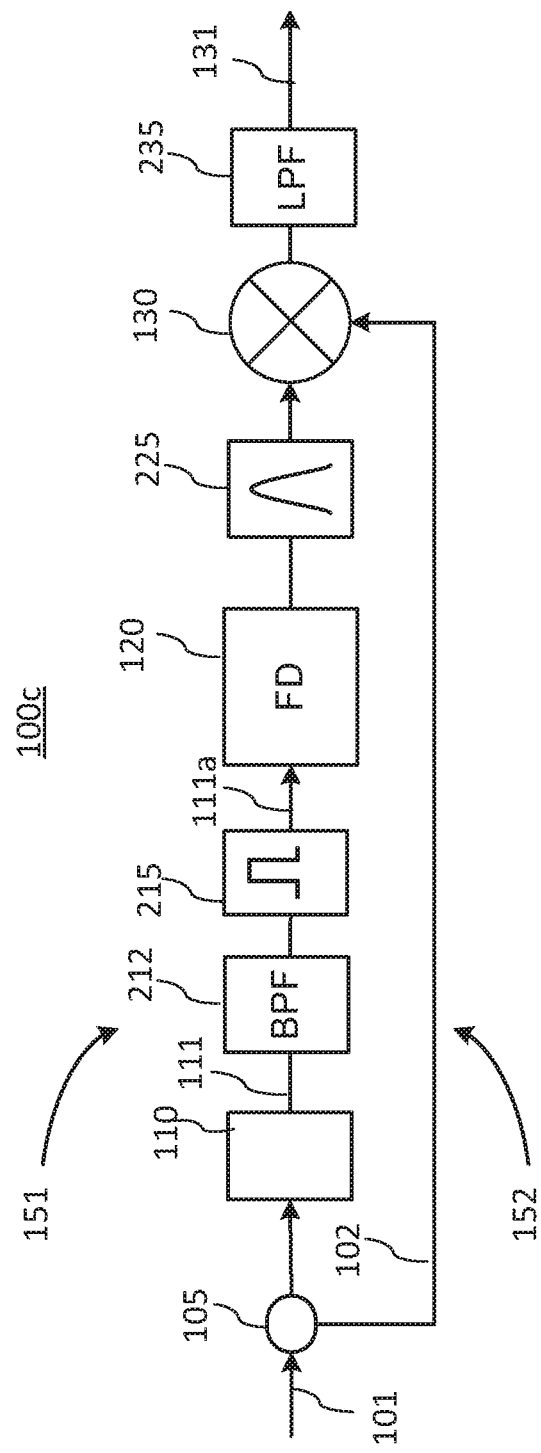
FIG. 7 is a schematic block diagram illustrating an embodiment of the circuit of FIG. 5 incorporating a passband filter for suppressing amplitude modulation.

Referring to FIG. 7, there is illustrated a variation of the PSK demodulating circuit of FIG. 5 that is indicated here as PSK demodulating circuit 100c. In the shown embodiment the PSK demodulating circuit 100c is generally as illustrated in FIG. 5, but further includes a BPF 212 that is inserted in the carrier recovery path 151 of the circuit between the multiplying or squaring circuit 110 and the frequency dividing circuit 120. The edge-sharpening filter 215 may be omitted in some embodiments. The pass band of the BPF 212 is centered at the carrier-multiplied frequency of the signal 111 at the output of the signal multiplying circuit 110, which is for example 2f if circuit 110 is a signal squaring circuit, and is configured so as to remove or suppress spectral components of the frequency-multiplied signal 111 which are due to the extraneous or residual amplitude modulation of the received PSK signal 101.

Figure 8A:
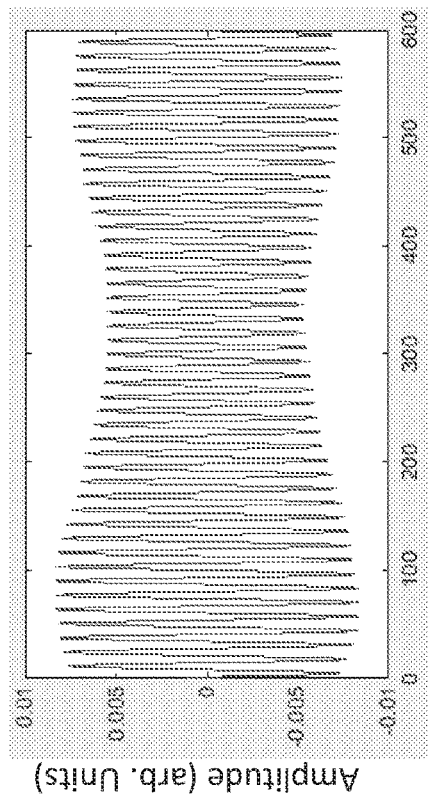
FIG. 8A is a plot illustrating an BPSK-modulated carrier wave signal with extraneous amplitude modulation at an input of the circuit of FIG. 7.
Figure 8B:
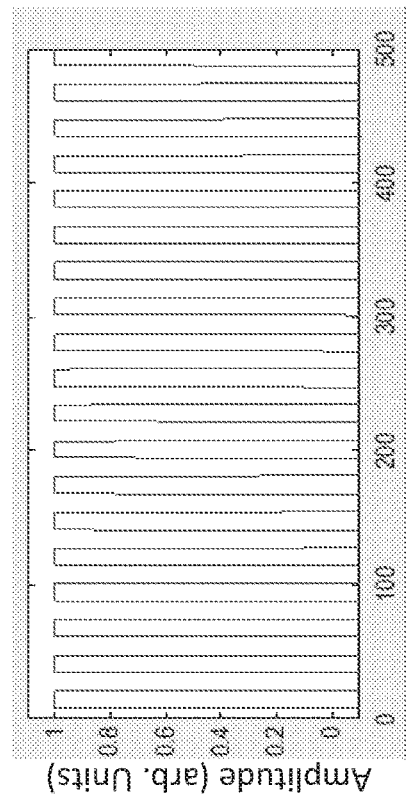
FIG. 8B is a plot illustrating the transformation of the BPSK-modulated carrier wave signal of FIG. 8A after the squaring circuit in the circuit of FIG. 7.
Figure 8C:
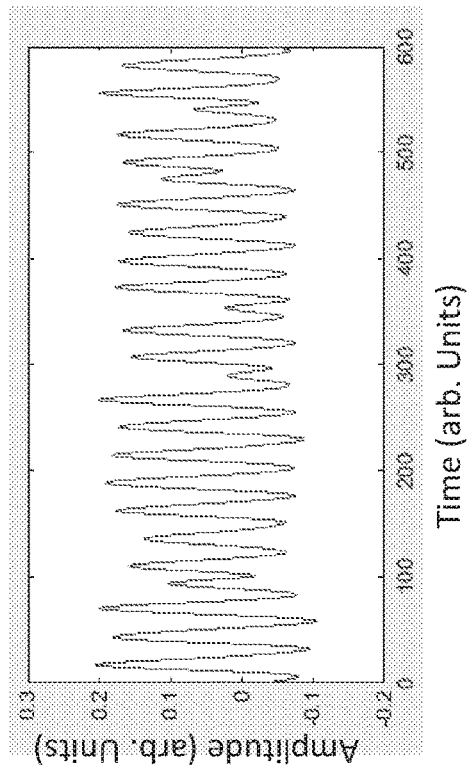
FIG. 8C is a plot illustrating the transformation of the BPSK-modulated carrier wave signal of FIG. 8A after the first band pass filter in the circuit of FIG. 7.
Figure 8D:
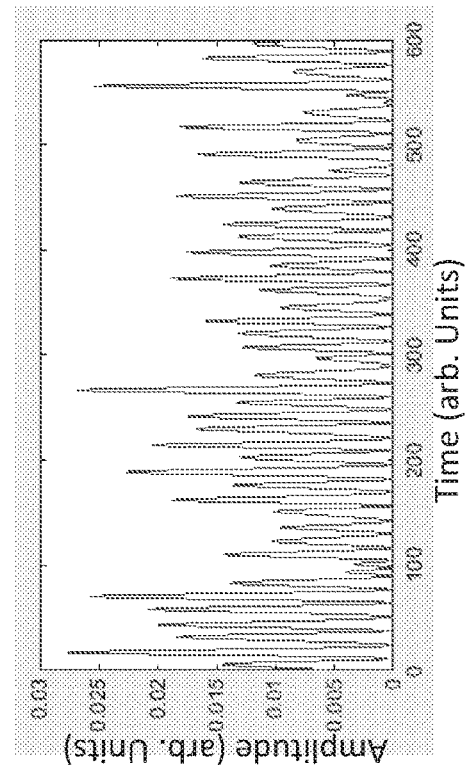
FIG. 8D is a plot illustrating the transformation of the BPSK-modulated carrier wave signal of FIG. 8A after the frequency divider in the circuit of FIG. 7.
Figure 8E:
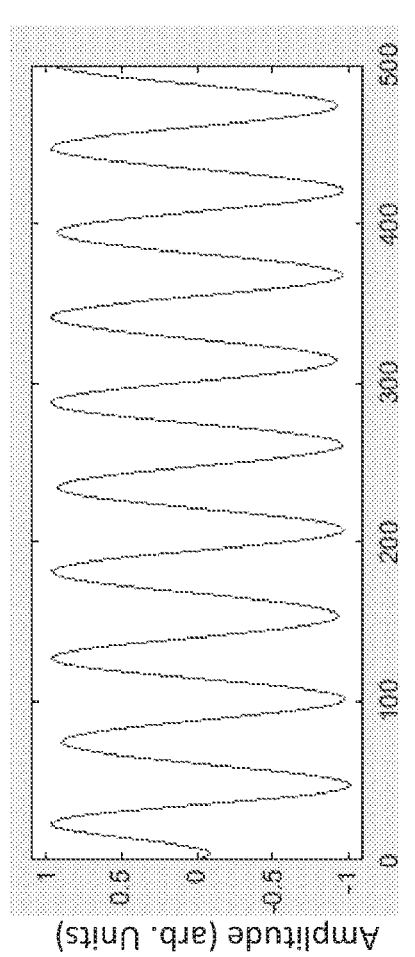
FIG. 8E is a plot illustrating the transformation of the BPSK-modulated carrier wave signal of FIG. 8A after the second band pass filter in the circuit of FIG. 7.
Figure 8F:
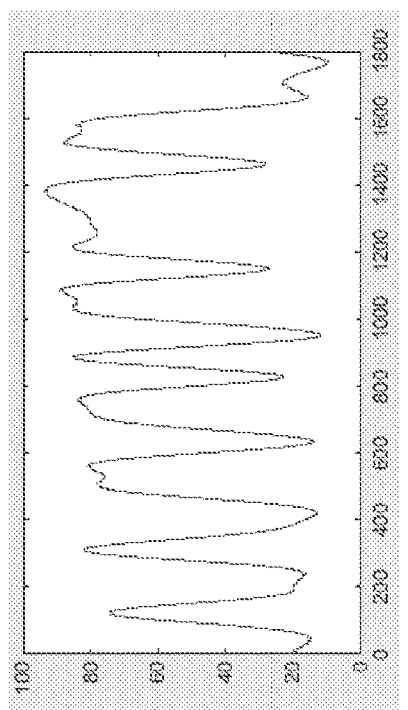
FIG. 8F is a plot illustrating the de-modulated BPSK signal at the output of the circuit of FIG. 7.
Figure 8G:
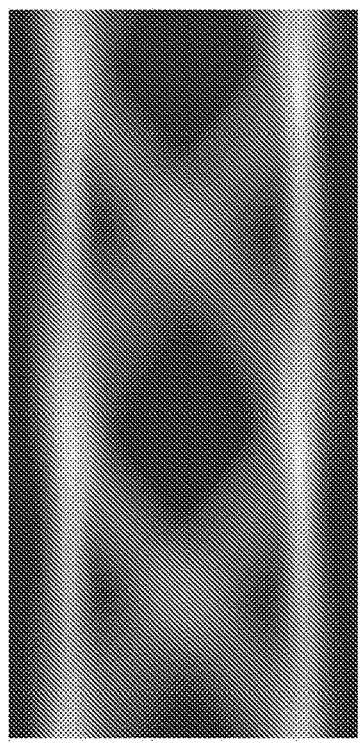
FIG. 8G is a plot illustrating an eye-diagram of the de-modulated BPSK signal at the output of the circuit of FIG. 7.

With reference to FIGS. 8A-8G, there is illustrated the transformation of an input BPSK modulated signal 101 as it propagates along the carrier recovery path 151 of the PSK de-modulating circuit 100c in an embodiment wherein the multiplying circuit 110 is a signal squaring circuit and the frequency dividing circuit 120 is a frequency-dividing flip-flop. All plots in these figures are generated using a measured BPSK modulated carrier signal with the carrier frequency f of 12 GHz from an optical heterodyne receiver for an example model circuit 100c. The incoming BPSK modulated carrier wave signal 101 has residual amplitude modulation, as illustrated in FIG. 8A. This signal is split into the two signal parts 102 and 103 and the first signal part 102 is used to generate the reference carrier wave signal 121, against which the second signal part 103 of the input BPSK signal is de-modulated using the first output signal mixer 130. The squared signal 111, as shown in FIG. 8B, is free of any phase jumps but shows significant amplitude variations. The BPF 212 removes most of these amplitude variations, and the resulting signal at the output of the BPF 212 is shown in FIG. 8C. The edge-sharpening filter 215 in this embodiment generates a positive fixed voltage at its output while its input is positive, and a low fixed voltage while its input voltage is negative. The frequency of the resulting rectangular signal is then divided by two by the frequency divider 120, with the resulting square-wave signal with period 1/f shown in FIG. 8D. The filter 225 with a pass-band centered at the carrier wave frequency f removes the harmonic components of the square wave, resulting in a generally sinusoidal reference wave 121 shown in FIG. 8E. This reference carrier wave is then used in the mixer stage 130 to de-modulate the incoming BPSK modulation, converting it to the baseband. The optional LPF 235 may be used to remove high frequency components of the output signal from the mixer 130 when desired, and the decoded signal is shown in FIG. 8F. The resulting eye diagram constructed for the de-modulated signal is well open, as shown in FIG. 8G.

Figure 9:
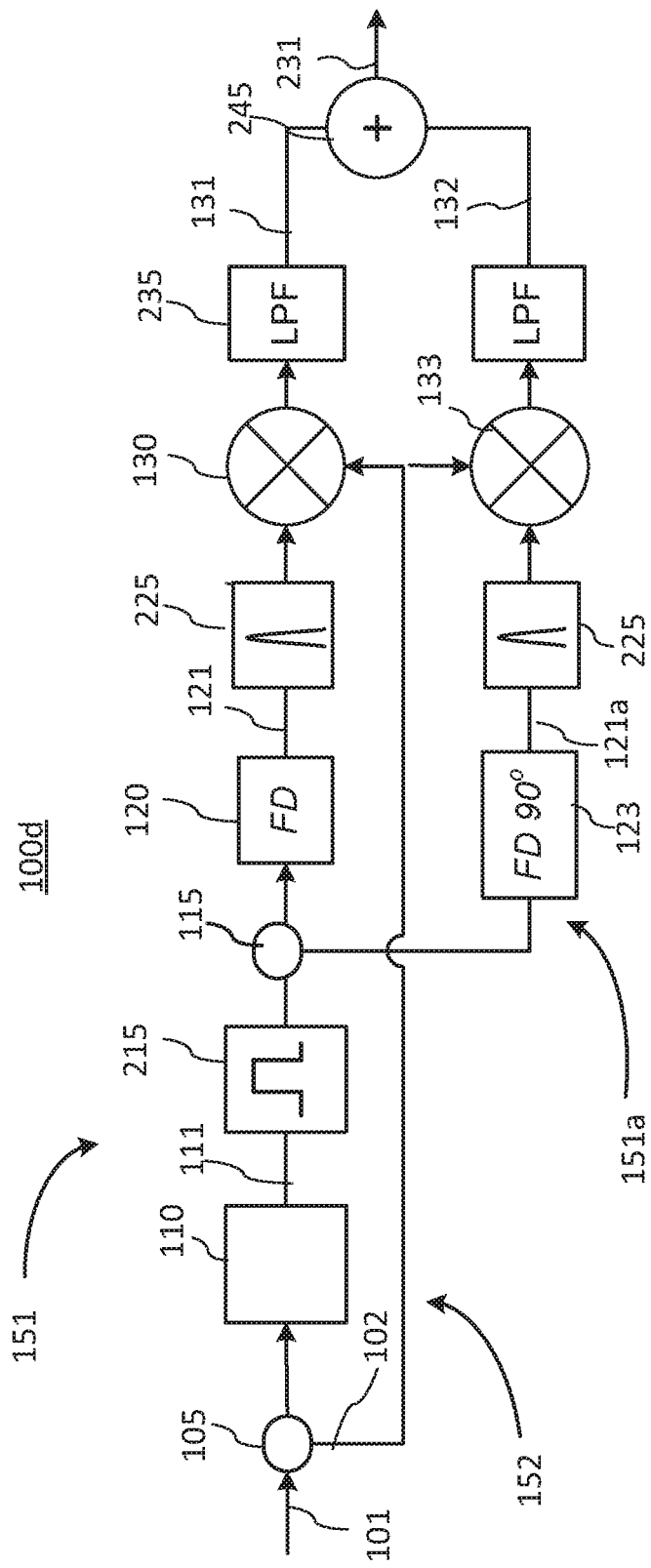
FIG. 9 is a schematic block diagram illustrating an embodiment of the circuit of FIG. 5 for demodulating BPSK signals incorporating two parallel frequency dividers for creating two homodyne references with a phase-shift therebetween.

Turning now to FIG. 9, there is illustrated a PSK demodulating circuit 100d in accordance with an embodiment of the present disclosure. This embodiment differs from that of FIG. 7 in that it includes a second frequency dividing circuit 123 that is connected in parallel with the first frequency dividing circuit 120 and is followed by a second output signal mixer 133. The carrier recovery path 151 is split into two using a signal splitter 115, so that a portion of the frequency multiplied analog carrier signal 111 is passed through the second frequency dividing circuit 123 in a second carrier recovery path 151a to obtain a second analog reference carrier wave signal 121a, which may be phase-shifted relative to the first analog reference carrier wave 121. This second analog reference carrier wave signal 121a is then mixed, using the second electrical signal mixer 133, with a portion of the second analog PSK-modulated signal 103 that propagated along the signal path 152. Mixed signals from the outputs of the first and second signal mixers 130, 133 are then combined by a signal combiner 245 to obtain a baseband demodulated signal 231. Optionally, the mixed signals from the mixers 130, 132 may be filtered using LPF filter or filters 235, which may be disposed electrically before or after the signal combiner 245. In one embodiment this phase shift between the first and second reference carrier wave signals 121 and 121a may be substantially 90° at the respective output mixers.

Thus, in the scheme of FIG. 9 two reference signals 121 and 121a with a phase-shift of, for example, 90° therebetween are produced from the same input PSK modulated carrier wave signal 101 using the frequency-multiplication followed by frequency-dividing technique as generally described hereinabove. These two phase-shifted reference signals 121 and 121a are used to produce two de-modulated signals 131, 132 having a relative phase shift therebetween, which are added together at the output of the circuit 100d. Summing two de-modulated signals produced by mixing a PSK-modulated carrier signal with reference carriers having a relative phase shift therebetween may improve the signal to noise ratio of the summary signal 231, in particular when the PSK modulation rate $R_{mod}$ is close to the carrier frequency f. In the illustrated embodiment the signal squaring circuit 110 produces the frequency-doubled signal 111, which is then optionally filtered with the edge-sharpening filter 215 and split into two frequency-doubled signals by a second signal splitter 115, with one of them directed to the first frequency dividing circuit 120 that is followed by the first signal mixer 235 with an optional first narrowband filter 225 therebetween, and the other directed to pass through the second frequency-dividing circuit 123 that is followed by the second signal mixer 235 with an optional second narrowband filter 225 therebetween.

In one embodiment the second frequency-dividing circuit 123 may be configured to output the second reference signal 121a, which is down-converted to the carrier wave frequency f, that is shifted in phase with respect to a first reference signal produced by the first frequency dividing circuit 120. The phase shift between the first and second reference signals 121, 121a may be, for example, 90°, or π/2 rad. The first and second frequency dividing circuits 120 and 123 may be embodied as frequency dividing electrical flip-flop circuits that are triggered at different edges of their respective input signals. For example, the first frequency dividing circuit 120 may be in the form of an electric flip-flop that is configured to be triggered by the leading edges of the input carrier-multiplied signal 111, while the second frequency dividing circuit 123 may be in the form of an electric flip-flop that is configured to be triggered by the trailing edges of the input carrier-multiplied signal 111, resulting thereby in the reference signal 121a that is delayed in phase by π/2 rad with respect to the first reference signal 121. In another embodiment, both the first and second frequency-dividing circuits 120, 123 may be in the form of, or include, electric flip-flops that are configured to be triggered from the same edges of the incoming signals, or at crossings of a pre-determined threshold signal level, and one of the first and second frequency-dividing circuits 120, 123 may additionally include a π/2 phase shifter (not shown).

Figure 10:
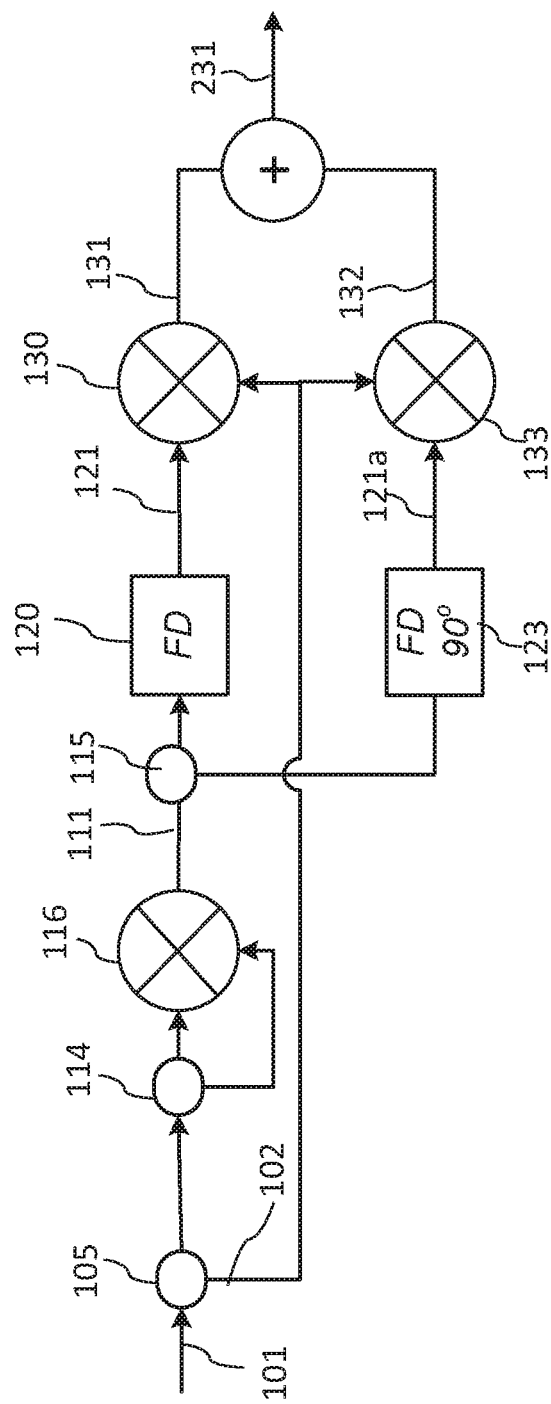
FIG. 10 is a schematic block diagram illustrating an embodiment of the circuit of FIG. 9 without intermediate filters.

Referring to FIG. 10, there is illustrated an embodiment of the PSK demodulation circuit of FIG. 9 for use at relatively high carrier wave frequencies f for example about or beyond 5-10 GHz, where natural bandwidth limitations of circuit components and/or electrical transmission lines, e.g., PCB traces in embodiments where the circuit is implemented in a printed circuit board (PCB), may make one or more of the frequency filters 215, 225, and 235 superfluous thereby allowing their removal from the circuit. FIG. 10 illustrates an embodiment of the PSK demodulation circuit of FIG. 9 without any of these filters, and with the squaring circuit 110 embodied using an electrical signal splitter 114 and an electrical signal mixer 116 as described hereinabove with reference to FIG. 3.

Figure 14:
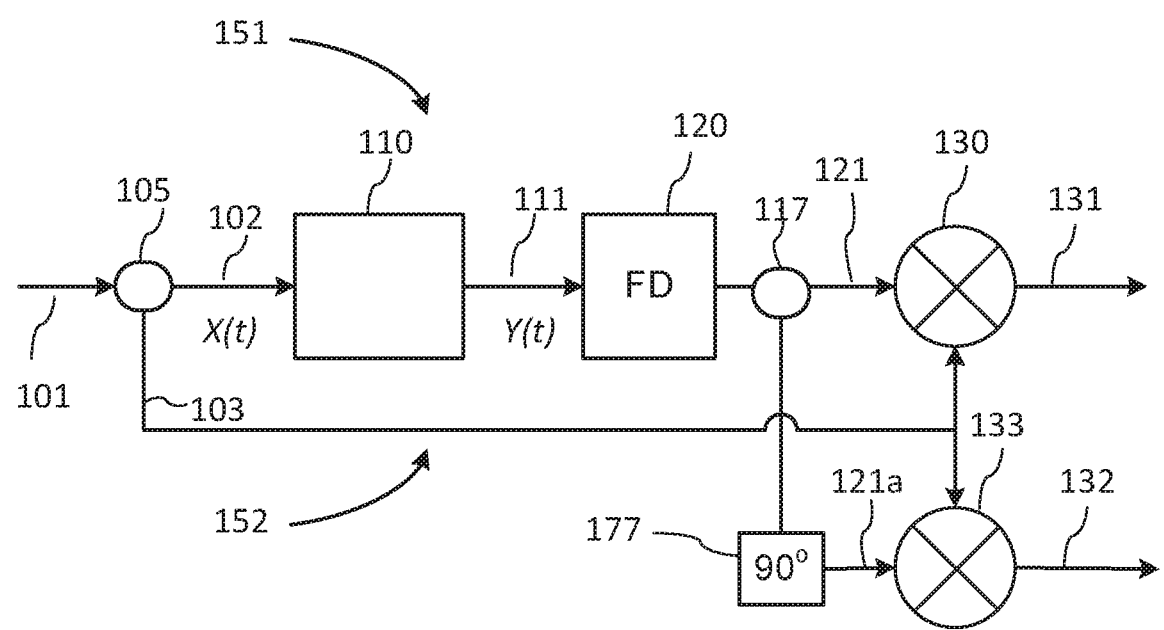
FIG. 14 is a schematic block diagram illustrating an embodiment of the optical heterodyne receiver of FIG. 11.

With reference to FIG. 14, the second reference carrier wave signal 121a may also be obtained from the first reference carrier wave signal 121 without adding the second frequency divider 123, as generally illustrated in the figure. In this embodiment a portion or copy of the first reference carrier wave signal 121 may be split off, for example using a signal splitter 117, and passed to a phase shifting device or circuit 177 that shifts, for example delays, the phase of the portion of the first reference carrier wave signal 121 it receives by 90°. It will be appreciated that the phase shifting device or circuit 177 may be implemented in a variety of ways, with the choices that may vary in dependence on the carrier wave frequency f. For example, in one embodiment the phase shifting device or circuit 177 may be implemented using an AC-coupled amplifier. This option may be easier to implement at relatively low carrier wave frequencies, for example in the low-GHz range and below. In another example, the phase shifting device or circuit 177 may be implemented using a suitable delay line; this option may be more suitable at the carrier wave frequency f in the 10-20 GHz range.

Although certain details of the technique and circuit of the present disclosure for demodulating PSK modulated analog carrier wave signals have been described hereinabove mainly with reference to demodulation of BSPK-modulated analog carriers, it will be appreciated that main principles of the technique can be applied to de-modulating higher-order PSK formats applied to electrical carrier waves, including but not limited to K-PSK with K>2 and $2^M$PSK with M>1. Referring back to the PSK demodulation circuit 100 illustrated in FIG. 1, it will be appreciated that if the input signal 101 is a $2^M$PSK modulated analog carrier wave at frequency f circuit 100 will de-modulated it if the multiplying circuit 110 is configured to perform M successive squaring operations, or a single operation of taking the input signal 101 to the $2^M$ power, so as to output a frequency-multiplied signal 111 with a frequency up-converted to $2^M \cdot f$, and the frequency dividing circuit 120 is configured to down-convert the frequency-multiplied signal 111 it receives to the input carrier wave frequency f. Bandwidth limitations of the electrical circuit elements used may however put a limit to the PSK modulation level M that may be de-modulated for a given input carrier wave frequency f.

Figure 11:
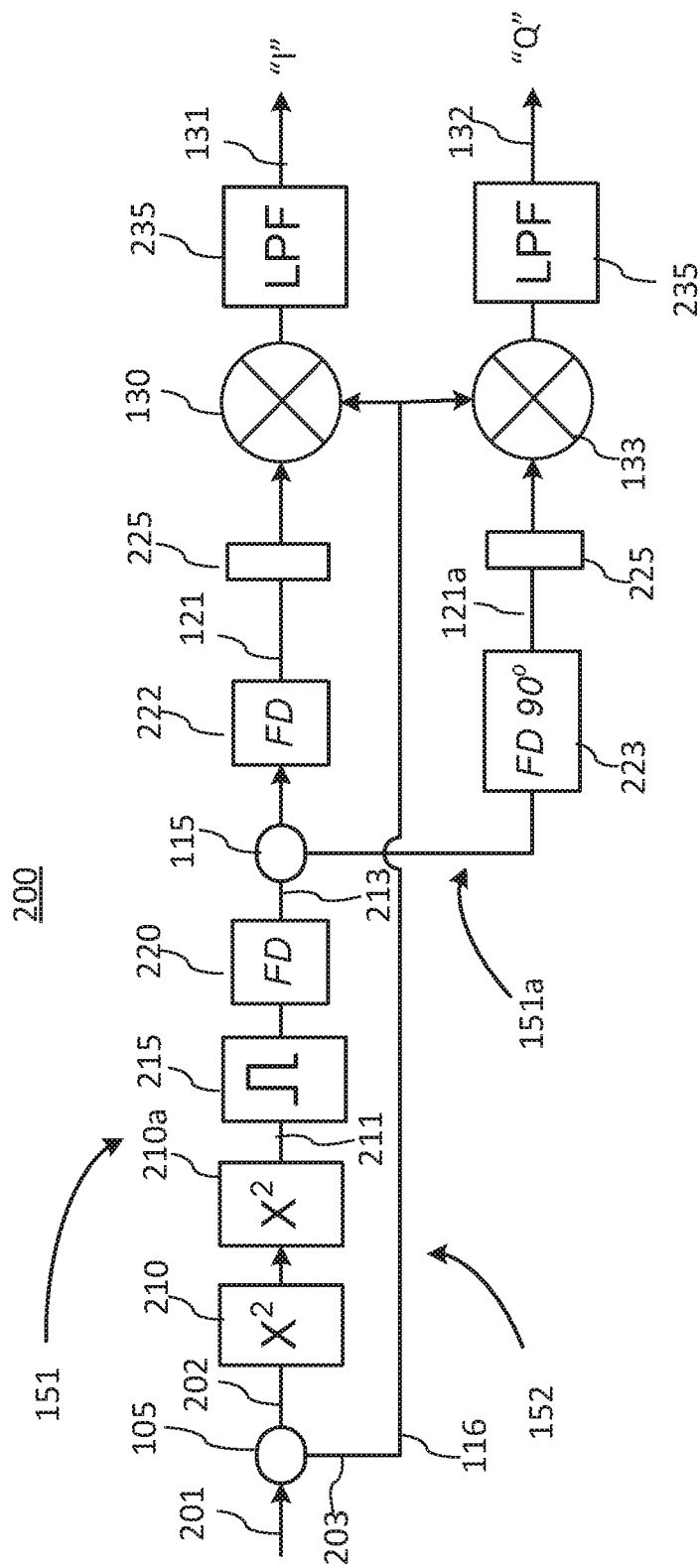
FIG. 11 is a schematic block diagram of a circuit for demodulating QPSK modulated carrier wave signals.

Referring now to FIG. 11, there is illustrated a PSK demodulation circuit 200 that is configured to demodulate a QPSK modulated carrier wave signal 201. As illustrated, the QPSK demodulating circuit 200 is similar to the BPSK de-modulating circuit of FIG. 9, except that circuit 200 lacks an output signal combiner 245 and thus outputs two demodulated signals 131 and 132, and additionally includes a second signal squaring circuit 210a that is disposed in series with the first signal squaring circuit 210. The input signal splitter 105 splits the received QPSK modulated carrier signal 201 with the carrier wave frequency f into two QPSK modulated carrier wave signals 202 and 203, and directs them along the carrier recover path 151 and the signal path 152, respectively. Each of the two QPSK modulated carrier wave signals 202 and 203 has the carrier wave frequency f and retains the time dependence characteristics of the received QPSK carrier signal 201. The second QPSK modulated carrier wave signal 203 is provided to one of the input ports of each of the two output signal mixers 130 and 133. The two serially connected squaring circuits 210 and 210a are followed by two frequency dividing circuits in each of the two carrier recovery paths 151 and 151a. The first frequency dividing circuit 220 may be shared between the two carrier recovery paths. The first carrier recovery path 151 includes a second frequency dividing circuit 222 connected in series with the first frequency dividing circuit 220 and outputs the first reference carrier wave 121. A third frequency dividing circuit 223 is connected in parallel with the second frequency dividing circuit 222 by means of a signal splitter 115. The second output electrical signal mixer 133 is connected to an output of the third frequency dividing circuit 223 for outputting a second de-modulated signal 132. Each of the frequency dividing circuits 220, 222 and 223 is configured to divide the frequency of their respective input signals by two, and may be embodied, for example, as a frequency-dividing flip-flop or switch as described hereinabove.

The two signal squaring circuits 210, 210a disposed in sequence embody a multiplying circuit that brings the first QPSK-modulated analog carrier wave signal 202 to the fourth power, thereby up-converting it in frequency to 4f and removing π/2 phase shifts originating from the QPSK modulation of the received carrier signal 201. The resulting frequency-multiplied signal 211 may generally be in the form of a sinusoid with a nominal frequency 4f, which may however slowly vary in frequency, phase and amplitude due to noise and/or non-idealities in preceding circuits, as inherited from the corresponding variations in the received QPSK-modulated carrier wave signal 201. Here, "slowly" means at a rate that is much smaller than the corresponding carrier frequency f and smaller than the QPSK modulation rate $R_{mod}$, for example at a rate that is less than f/10 and typically not greater than f/100. The frequency-multiplied, or in this case frequency-quadrupled, analog carrier signal 211 may be optionally passed through an edge-sharpening filter 215, and then directed to the first frequency-dividing circuit 220. An additional passband filter centered at the quadrupled frequency 4f may be disposed prior to the frequency-dividing circuit 122 to filter out residual amplitude modulation if desired, as described hereinabove with reference to FIG. 7. The frequency-dividing circuit 120 divides the frequency of the received signal 211 by two, outputting a frequency-doubled carrier signal 213, which is then processed similarly to the frequency-doubled signal 111 in circuit 110d of FIG. 9 to obtain first and second reference signals 121 and 121a using two frequency-dividing circuits 222, 223. The third frequency-dividing circuit 223 is configured to add or subtract a 90° phase shift to its output reference carrier signal 121a relative to the output signal 121 of the second frequency-dividing circuit 222, as described hereinabove with reference to FIG. 9 and the frequency dividing circuits 120 and 123. Signal mixers 130 and 133 mix the first and second reference signals 121 and 121a having a 90° relative phase shift therebetween with split-off portions of the second QPSK modulated carrier wave signal 203 to obtain the first and second baseband de-modulated signals 131 and 132 that represent an 'in-phase' (I) and 'quadrature' (Q) modulation components of a QPSK modulation signal. The 90° phase difference in relative phases of the mixing signals in the signal mixers 130 and 133 that is desired to obtain the quadrature modulation signals 131 and 132 may be realized by using the frequency dividers 120 and 123 triggered by differently inclined edges of the frequency-doubled signal 213, so that one of them is triggered by the rising edges of the received signal and the other—by the falling edges of the received signal. In another embodiment, a π/2 phase shifter, such as for example a 1/(4f) delay line, may be used to provide the desired phase shift between the first and second reference signals 121 and 121a at the respective mixers. In another embodiment, the desired π/2 phase shift may be added to one of the split-off QPSK signals 203 prior to mixing with one of the corresponding reference signals 121 and 121a. Filters 215, 225, and 235 may be substantially as described hereinabove with reference to FIGS. 5, 7, and 9; one or more of these filters may be omitted in some embodiments.

In another embodiment of the QPSK demodulation circuit 200, the second reference carrier wave signal 121a may be obtained from the first reference carrier wave signal 121 without adding the third frequency divider 223 and using a phase shifting device and circuit 117, as generally illustrated in FIG. 14 and described hereinabove. In this embodiment the multiplier 110 in FIG. 14 may be in the form of the two squaring circuits 210 and 210a in series as illustrated in FIG. 11, and the frequency divider 120 of FIG. 14 may be in the form of the first and second frequency dividers by two 220, 222 connected in series, as illustrated in FIG. 11. In this embodiment, a portion or copy of the first reference carrier wave signal 121 from the output of the second frequency divider 222 may be split off, for example using the signal splitter 117, and passed to a phase shifting device or circuit 177 that shifts, for example delays, the phase of the portion of the first reference carrier wave signal 120 it receives by 90°. The phase shifting device or circuit 177 may be implemented as described hereinabove, for example using an AC-coupled amplifier or a suitable delay line.

Figure 12:
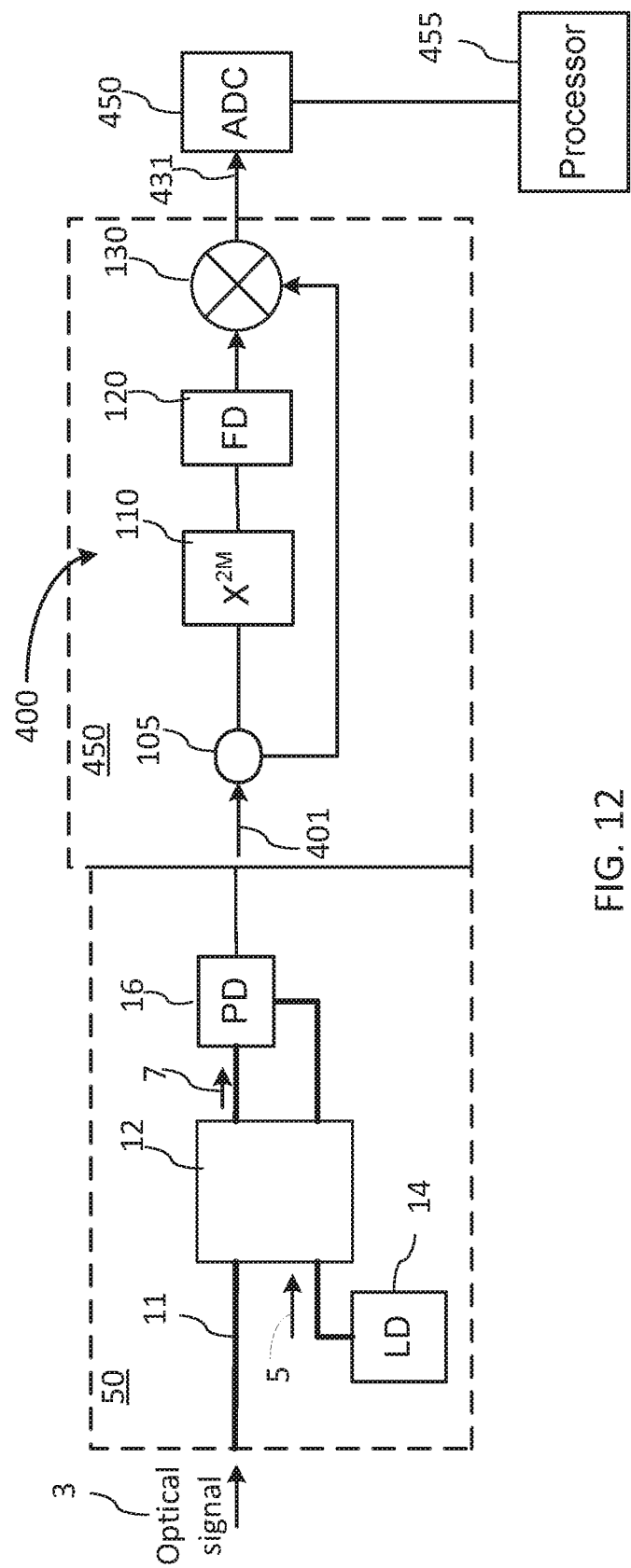
FIG. 12 is a schematic block diagram of an optical heterodyne receiver of optical PSK signals incorporating an electrical circuit for demodulating PSK-modulated carrier signals.

Turning now to FIG. 12, an electrical PSK demodulation circuit 400 incorporating principles of the present disclosure may be used in a heterodyne receiver of optical BPSK and QPSK signals. Such a receiver may include an optical reference source 14 that is configured for producing an optical reference signal 5, an optical mixer 12 that is configured for mixing an input optical PSK modulated signal 3 with the optical reference signal 5 and to output a mixed optical signal 7, and a photodetector (PD) 16 disposed to receive the mixed optical signal 7 for converting thereof into an electrical PSK-modulated carrier wave signal 401, which is then provided to the PSK demodulating electrical circuit 400. The optical front-end of the receiver, including the optical mixer 12 and the reference optical source 14, may be embodied for example as a photonic integrated circuit (PIC) formed in or upon a suitable substrate. For example, it may be embodied using the Silicon on Isolator (SOI) technology as a SOI PIC chip 50 with an input optical waveguide port 11, which may also incorporate the PD 16. The optical mixer 12 may be for example in the form of a 2×2 multi-mode interference (MMI) coupler as known in the art, with one of the input ports connected to an input optical waveguide for receiving the optical PSK signal 3, and another coupled to the reference LD 14, with the PD 16 optically coupled to one or both of the output ports of the MMI coupler 12. When coupled to both output ports of the MMI coupler 12 as illustrated in FIG. 12, PD 16 may be implemented as a differential photodetector, for example formed of two differentially connected photodiodes (not shown), each of which coupled to a different output port of the MIMI coupler 12. The reference optical source 14 may be embodied using a laser diode (LD), which may be wavelength-stabilized at a reference wavelength that differs slightly from the wavelength of the incoming optical signal 3, with a difference in their optical frequency defining the carrier wave frequency f of the electrical PSK modulated signal 401 at the output of the PD 16. The PSK demodulating electrical circuit 400 may be embodied for example as described hereinabove with reference to FIGS. 1, 3, 3, 5, 7 and 9-11, with an input electrical port coupled to the output of the PD 16 to receive the PSK-modulated electrical carrier signal 401. In some embodiments the de-modulated PSK signal or signals 431 from the output of the PSK demodulating circuit 400 may be converted to a digital domain by an ADC 450 and then sent to a processor 455 for further processing and decoding. The de-modulated PSK signal may be comprised of two de-modulated 'I' and 'Q' signals, as described hereinabove with reference to FIG. 11. The PSK demodulating circuit 400 may be implemented in a single semiconductor chip, or may be a hybrid electrical circuit comprised of one or more electrical sub-circuits that may be mounted on a support base 450, that for example may be in the form of a PCB. In another embodiment, the support base 450 may be a single semiconductor substrate or wafer, wherein the circuit elements 105, 110, and 120 are integrated. For example, the PSK demodulating circuit 400 may be in the form of a CMOS chip or a SiGe chip.

Figure 13:
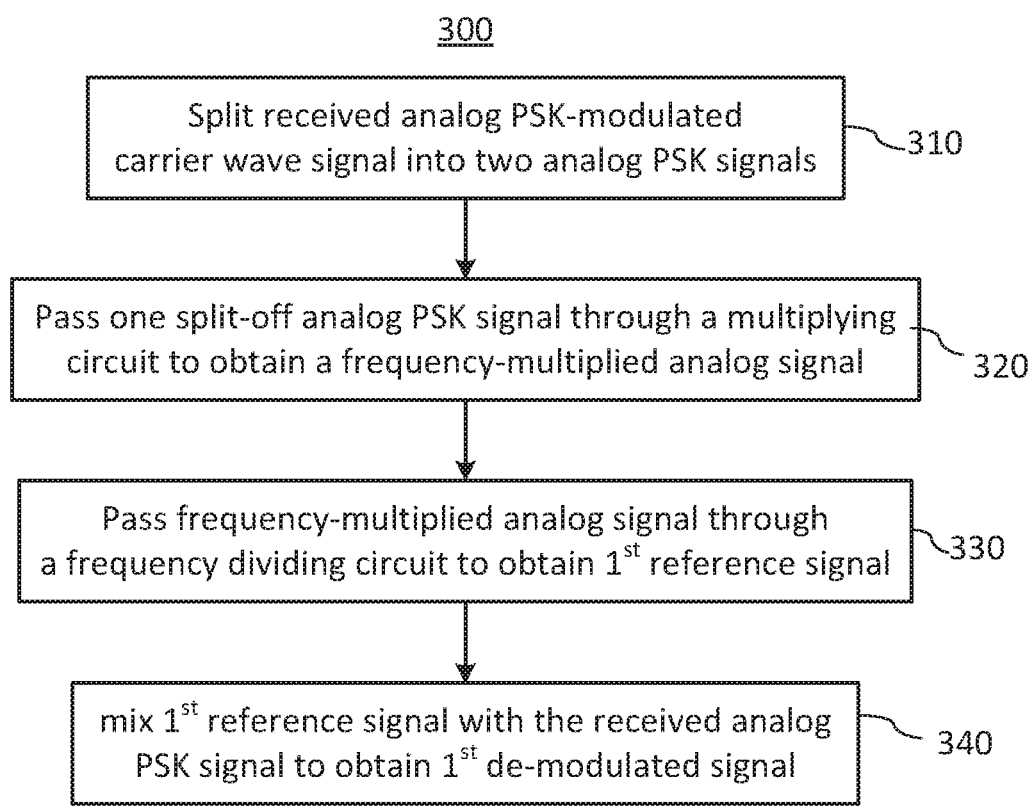
FIG. 13 is a flowchart of a method for demodulating a PSK-modulated carrier wave signal in analog signal domain.

Referring now to FIG. 13, embodiments of the PSK demodulating circuit that are described hereinabove are configured to implement a method of demodulating a received PSK-modulated carrier signal, which enables to perform carrier recovery in the domain of analog signals. An embodiment of the method may be generally described as follows. The method may start with a step or operation 310 wherein the received analog PSK-modulated carrier is split into two analog PSK-modulated signals, each in the form of a PSK-modulated carrier wave signal with a carrier wave frequency f that may vary in time. At step or operation 320, a first of the two analog PSK-modulated signals is passed through a multiplying circuit to obtain a frequency-multiplied analog carrier signal that is substantially absent of the PSK modulation. At step or operation 330, the frequency multiplied analog carrier signal is passed through a first frequency dividing circuit to obtain a first analog reference carrier wave signal with the carrier wave frequency f. Finally, at step or operation 340 the first analog reference carrier wave signal is mixed with the second of the two analog PSK-modulated signals using a first output electrical signal mixer to obtain a first de-modulated signal in the baseband. The signal splitting operation 310 may be in the form of a passive signal splitting wherein the input PSK signal is split in two PSK signals of lower signal power, or may be in the form of making a copy or copies of the received PSK signal so as to retain the frequency vs. time and phase vs. time information of the received PSK signal.

In one embodiment, step or operation 320 of the method may include directing a first of the two analog PSK-modulated signals into two input ports of an electrical signal mixer. In one embodiment step or operation 330 may include passing the frequency-multiplied analog carrier signal through an electrical switching circuit that is configured to switch a transmission state thereof from an "ON" state to an 'OFF" state in phase with every other peak or oscillation of a signal at the input of the switch. The electrical switching circuit may be an ON-OFF switching circuit configured to switch a transmission state of the switching circuit from an "ON" state to an 'OFF" state. In one embodiment, the electrical switching circuit may be in the form, or include, an electrical frequency-dividing flip-flop circuit.

In one embodiment the received carrier signal may be in the form of a BPSK modulated signal, and step or operation 320 may include passing the first of the two analog PSK-modulated signals through a signal squaring circuit, which may be in the form or include an electrical signal mixer. In one embodiment the received PSK-modulated carrier signal may be a QPSK modulated signal, and step (b) may include passing the first of the two analog PSK-modulated signals through two signal squaring circuits in series.

In one embodiment the received carrier signal may be a $2^M$PSK modulated carrier wave signal, where M is an integer greater than 0, and step or operation 320 may include passing the first of the two analog PSK-modulated signals through M signal squaring circuits connected in series. In one embodiment step or operation 330 may include passing the frequency-multiplied carrier wave signal through M frequency-dividing electrical flip-flop circuits connected in series.

In one embodiment, the method may include obtaining, from the frequency-multiplied carrier signal, a second reference carrier wave signal that is phase-shifted relative to the first reference carrier wave signal, and mixing the second reference carrier wave signal with at least a portion of the second of the two analog PSK-modulated signals using a second electrical signal mixer.

In one embodiment wherein the received carrier signal is QPSK modulated, step or operation 320 of the method may include sequentially passing the first of the two analog PSK-modulated signals through two signal squaring circuits for converting into a frequency-quadrupled carrier signal. Step or operation 330 may then include sequentially passing at least a portion of the frequency quadrupled carrier signal through the first frequency dividing circuit and a second frequency dividing circuit. The method may further include passing a portion of a signal from an output of the first frequency dividing circuit to a third frequency dividing circuit to obtain the second reference carrier wave signal that is phase-shifted with respect to the first reference carrier wave signal by 90°, and obtaining, from the second electrical signal mixer, a second de-modulated signal in quadrature with the first de-modulated signal.

Advantageously, the method and circuit for demodulating PSK modulated carrier signals, which principles are described hereinabove with reference to specific embodiments, enable to perform analog-domain carrier recovery and demodulation of PSK modulated carriers using well-known electrical circuits and circuit elements, such as signal mixers and flip-flops, and do not require fast signal digitizers or digital processors that are capable of working at the carrier frequency. The method and circuit may be used, for example but not exclusively, for demodulating PSK-modulated carrier signals that appear in optical heterodyne detection with LO lasers that are not frequency-locked to a signal transmitting source.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. Thus, such other embodiments and modifications are intended to fall within the scope of the present disclosure. For example one or several amplifiers might be placed within the carrier recovery path of the PSK de-modulating circuits described hereinabove in order to compensate for the losses by the filters and/or other elements in the path. The filters may be implemented as passive LRC based structures or may contain active elements.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A method for demodulating a received phase shift keying (PSK) signal, the method comprising:
   splitting the received PSK signal into a first PSK signal and a second PSK signal, each comprising a PSK-modulated carrier wave with a carrier wave frequency f;
   multiplying the first PSK signal upon itself at least once to obtain a frequency-multiplied carrier signal absent of PSK modulation;
   using one or more frequency dividing flip-flop circuits to obtain, from the frequency multiplied carrier signal, a first reference carrier wave signal at the carrier wave frequency f; and,
   mixing the first reference carrier wave signal with the second PSK signal to obtain a first de-modulated signal;
   wherein the method further comprises obtaining the first reference carrier wave signal from the frequency multiplied carrier signal using the one or more frequency dividing flip-flop circuits without frequency or phase locking.

2. The method of claim 1 wherein the multiplying comprises directing the first PSK signal into two input ports of an electrical signal mixer to obtain a frequency-doubled signal.

3. The method of claim 1 comprising applying an edge-sharpening filter to the frequency-multiplied carrier signal to obtain a square-wave frequency-multiplied carrier signal, and passing the square-wave frequency-multiplied carrier signal through the one or more frequency dividing flip-flop circuits to obtain the first reference carrier wave signal with the carrier wave frequency f.

4. The method of claim 3, further comprising passing the first reference carrier wave signal through a low-pass filter with a passband including the carrier wave frequency f but excluding harmonics thereof to provide the first reference carrier wave signal with a generally sinusoidal waveform.

5. The method of claim 1, further comprising:
   obtaining, from the frequency-multiplied carrier signal, a second reference carrier wave signal that is phase-shifted relative to the first reference carrier wave signal; and,
   mixing the second reference carrier wave signal with at least a portion of the second PSK signal to obtain a second de-modulated signal.

6. The method of claim 5 wherein the received PSK signal is binary-PSK (BPSK) modulated, further comprising combining the first and second de-modulated signals to obtain an output de-modulated signal.

7. The method of claim 5 comprising passing a first portion of the frequency-multiplied carrier signal, or a signal obtained therefrom, through a first flip-flop circuit to obtain the first reference carrier wave signal, and passing a second portion of the frequency-multiplied carrier signal, or a signal obtained therefrom, through a second frequency dividing flip-flop circuit to obtain the second reference carrier wave signal.

8. The method of claim 7 wherein the second frequency dividing flip-flop circuit is configured to output the second reference wave signal that is shifted in phase by 90° with respect to the first reference wave signal.

9. The method of claim 5, wherein the received PSK signal is quadrature-PSK (QPSK) modulated, comprising:
   sequentially passing the first PSK signal through two signal squaring circuits to obtain a frequency-quadrupled carrier signal;
   passing the frequency-quadrupled carrier signal through a first flip-flop circuit to obtain a frequency-doubled carrier signal;
   passing a first portion of the frequency-doubled carrier signal through a second frequency dividing flip-flop circuit to obtain the first reference carrier wave signal; and,
   passing a second portion of the frequency-doubled carrier signal through a third frequency dividing flip-flop circuit configured to obtain the second reference carrier wave signal that is in quadrature with the first reference carrier wave signal.

10. An electrical circuit for demodulating a received PSK signal, the electrical circuit comprising:
    a first signal splitter configured to split the received PSK signal into a first PSK signal and a second PSK signal, each comprising a PSK-modulated carrier wave with a carrier wave frequency f;
    a multiplying circuit configured to convert the first PSK signal into a frequency-multiplied carrier signal absent of PSK modulation;
    a frequency dividing circuit comprising one or more flip-flop circuits and configured to convert the frequency multiplied carrier signal into a first reference carrier wave signal at the carrier wave frequency f in the absence of frequency or phase locking; and,
    a first electrical signal mixer configured to mix the first reference carrier wave signal with the second PSK signal to extract a first de-modulated signal from the second PSK signal.

11. The electrical circuit of claim 10, wherein the multiplying circuit comprises at least one electrical signal mixer.

12. The electrical circuit of claim 10 wherein the multiplying circuit comprises an edge-sharpening filter disposed operationally between the multiplying circuit and the frequency dividing circuit.

13. The electrical circuit of claim 12 wherein the multiplying circuit further comprises a low-pass filter disposed downstream of the edge-sharpening filter, the low-pass filter having a passband including the carrier wave frequency f but excluding harmonics thereof to provide the first reference carrier wave signal with a generally sinusoidal waveform.

14. The electrical circuit of claim 10, wherein the multiplying circuit comprises a signal squaring circuit.

15. The electrical circuit of claim 10 wherein the frequency dividing circuit comprises:

a second signal splitter disposed downstream of the multiplying circuit to split an output signal thereof into a first frequency-multiplied signal and a second frequency-multiplied signal;

a first frequency-dividing flip-flop circuit configured to convert the first frequency-multiplied signal into the first reference carrier wave signal;

a second frequency-dividing flip-flop circuit configured to convert the second frequency-multiplied signal into a second reference carrier wave signal that is phase-shifted relative to the first reference carrier wave signal; and, a second electrical signal mixer connected to an output of the second frequency dividing flip-flop for outputting a second de-modulated signal.

16. The electrical circuit of claim 15 wherein the second frequency-dividing flip-flop circuit is configured to output the second reference carrier wave signal that is phase-shifted relative to the first reference carrier wave signal by 90°.

17. The electrical circuit of claim 15 comprising a signal combining circuit disposed to combine the first and second de-modulated signals.

18. The electrical circuit of claim 15 wherein the received PSK signal comprises a quadrature PSK (QPSK) signal, and wherein the multiplying circuit comprises:

two signal squaring circuits connected in series, and a third frequency-dividing flip-flop circuit disposed downstream of the two signal squaring circuits.

19. The electrical circuit of claim 18 wherein the multiplying circuit further comprises an edge sharpening filter disposed operationally between the third frequency-dividing flip-flop circuit and the two signal squaring circuits.

* * * * *